United States Patent Office 2,923,621
Patented Feb. 2, 1960

2,923,621

NICKEL-BASE BRAZING ALLOY CONTAINING MANGANESE

George Sidney Hoppin III, Fairfield, Ohio, assignor to General Electric Company, a corporation of New York No Drawing. Application December 24, 1957
Serial No. 704,904

3 Claims. (Cl. 75—171)

This invention relates to elevated temperature, nickel-base brazing alloys and, more particularly, to nickel-base, nickel-chromium-silicon-manganese type brazing alloys suitable for use up to about 1800° F.

The term "brazing" generally applies to the joining of members by a method in which a metal or alloy called a "brazing alloy" is positioned, melted, and then solidified between members being joined. Various melting methods may be used, for example, using a torch as in "torch brazing," a furnace as in "furnace brazing" or a molten bath as in "dip or flux brazing." The metal of the members being joined does not melt as in welding but is held together at the brazed joint by a combination of adhesion and diffusion. Diffusion, in this case, is the passage of atoms of metal in the brazing alloy into the structure of the metals being joined. It occurs because a metal structure is made up of a group of grains having between them boundaries which may act as passageways for small atoms or other elements. Atoms which are smaller than these passageways can flow from the brazing metal into the structure. Therefore it is important that a brazing alloy be fluid at the brazing temperature to a degree sufficient to wet the members being joined. The "brazing temperature" is that temperature to which the brazing alloy is heated to cause flow or melting of the brazing alloy. However, the lowest possible brazing temperature is desirable for a high temperature brazing alloy (1) because industry generally does not have brazing furnaces that can exceed about 2100° F., (2) because heating to temperatures above 2100° F. may cause the metal grains of the members being joined to grow thereby dangerously decreasing their strength, and (3) when a brazing furnace rated for use at about 2100° F. is operated much above that temperature, its life is significantly decreased. Some other sought after features in high temperature brazing alloys are that, during brazing, they have low erosive properties (that is, they do not attack the material adjacent the joint), and that after brazing, they have good oxidation resistance and brazed joint strength.

Available nickel-base brazing alloys suitable for use at about 1800° F. or above generally can be divided into three classes: (1) nickel-chromium-silicon-boron, (2) nickel-silicon-boron, and (3) nickel-chromium-silicon. Of these, the least erosive during brazing is the nickel-chromium-silicon alloy because boron causes more erosion than do the other elements of those combination. However, the brazing temperature of alloys of this type is about 2200° F. or about 100° F. above the limit of many industrial furnaces in which such operations as copper brazing are performed. Because of this temperature limitation, industry has been forced to accept inferior brazing alloys to be used on some structures for use at elevated temperatures.

Therefore, one of the primary objects of my invention is to provide an improved nickel-base brazing alloy for forming brazed structures suitable for use up to about 1800° F. and which has a brazing temperature of about 2100° F. or below.

Another object is to provide an improved brazing alloy which during brazing has good flow characteristics and low erosion properties, and which after brazing has good joint strength and oxidation resistance up to about 1800° F.

Briefly stated, in accordance with one aspect of my invention, I provide an improved nickel-base brazing alloy which starts to melt below 2000° F. and which can be used in brazing below 2100° F. comprising in percent by weight 10–30 chromium, 8–12 silicon, 7–15 manganese with the balance essentially nickel and impurities.

A widely used nickel-base, nickel-chromium-silicon type of brazing alloy, known as "GE–81 alloy," has the following approximate composition:

| | Percent by weight |
|---|---|
| Chromium | 18–20 |
| Silicon | 9.75–10.5 |
| Others | 5 max. |
| Nickel | Balance |

Although this alloy has good flow characteristics, good oxidation resistance and good joint strength, it must be brazed at a temperature of about 2200° F. Since a large number of industrial brazing furnaces such as those used for copper brazing cannot reach the required 2200° F., "GE–81 alloy," is not generally usable industrially.

I have found that manganese when added to nickel has an appreciable effect in reducing the melting point of nickel. The elements silicon and boron have a similar effect but the inclusion of boron greatly increases the erosion or "chewing" attack on thin metals being brazed. Therefore I found that a combination of manganese and silicon in a nickel-base brazing alloy had a lower melting point than currently available similar high temperature brazing alloys. Since manganese has poor oxidation resistance, my addition of large quantities of that element imparted poor oxidation resistance to the alloys thus formed. I also noted that there was a limit of manganese addition below which the melting point of the alloy formed was not appreciably affected. In addition, to increase oxidation resistance of my alloy, I substituted chromium for part of the nickel. Manganese, in addition to lowering the melting point, improved the wettability of the final alloy over other available materials. I have found that the useful range of my alloy is, in percent by weight, 10–30 chromium, 8–12 silicon, 7–15 manganese with the balance essentially nickel and impurities.

My invention will be better understood from my description and the examples which are given by way of illustration only and not in any sense by way of limitation. The scope of my invention will be pointed out in the claims.

EXAMPLE 1

Although I have discussed my alloy in the broadest range which I have found it to be useful, I prefer an alloy of the following specific composition:

| | Percent by weight |
|---|---|
| Chromium | 20 |
| Silicon | 9.5 |
| Manganese | 9 |
| Nickel | [1] Balance |

[1] Including impurities.

An alloy of this composition was melted and, after cooling, was pulverized to about a −200 mesh size powder. I then formed a putty-like paste by mixing that powder with a small amount of a binder of the acrylic resin type dissolved in toluene. This paste was used to produce a brazed joint through a conventional brazing operation such as the following:

I placed this putty-like material in a gap between two metallic members to be joined so that the entire gap was filled and a fillet remained above the gap. Although my alloy may be used to join any elevated temperature materials, in this example I used material of the composition in percent by weight of about 20% chromium, about 1% silicon, about .05% carbon, with the balance essentially nickel and impurities. I placed the members thus prepared in a furnace, the air atmosphere of which I then displaced with a dry hydrogen atmosphere. The temperature of the furnace was raised to about 1980° F. where it was noted that the melting of the brazing alloy began. As the temperature was being raised to the 2075° F. brazing temperature, it was noted that complete melting of the alloy occurred at about 2050° F. I held the part at that brazing temperature for a time sufficient to allow my brazing alloy to flow into place. After brazing at about 2075° F., the resulting bond was tested and found to have excellent oxidation resistance up to about 1800° F., good erosion resistance and good joint strength as shown by the following tests:

(A) *Oxidation resistance test.*—A number of metal T joints were formed by brazing together as above into the shape of a T two panels of a cobalt-base metal of the following nominal composition:

| | Percent by weight |
|---|---|
| Chromium | 20 |
| Nickel | 10 |
| Iron | 2.5 |
| Tungsten | 15 |
| Cobalt | Balance |

T joint test panels were prepared using "GE-81" brazing alloy for comparison purposes. These T joints were held for about 50 hours in slowly moving air at various temperatures. Microscopic examinations were made before and after testing to determine the extent of oxidation attack on the brazed joints. The results showed my alloy to have excellent oxidation resistance equal to that of "GE-81" which has a brazing temperature of about 100° F. higher.

(B) *Erosion test.*—A half gram of my preferred brazing alloy powder was placed in a dimple on a 0.005" thick panel of the type of cobalt-base material described above in the oxidation resistance test as well as on similar panels of a nickel-base alloy of the following nominal composition:

| | Percent by weight |
|---|---|
| Nickel | 79 |
| Chromium | 20 |
| Silicon | 1 |

These panels were then heated to about 2100° F. and inspected at various periods of time. The degree of erosion was rated by the period of time required for the alloy to "chew" or erode through the panels. Penetration through the 0.005" sheet metal for both "GE-81" and my preferred alloy occurred at about 30 minutes and each eroded holes in about 60 minutes.

(C) *Joint strength tests.*—Simple lap joints were prepared of ¾" wide, 0.063" thick sheet material of the cobalt base material described in the tests above. In these joints, a uniform brazing clearance of 0.002" was used and the overlap length was varied between 0.10 and 1.00". Following brazing, a ½" wide gage length was ground into the overlap area of the test specimens. The results of tensile testing performed on these lap joints at both room and selected elevated temperature are shown in Table 1.

Table 1

| Test Temperature | Overlap (in.) | Breaking Load (lbs.) | Indicated Shear Strength (p.s.i.) | Indicated Tensile Strength (p.s.i.) |
|---|---|---|---|---|
| Room | .10 | 2,050 | 41,500 | |
| | .20 | 1,950 | 19,500 | |
| | .40 | 2,550 | 12,800 | |
| | .75 | 3,150 | 8,480 | |
| | 1.00 | 3,400 | 6,920 | |
| 1,500° F | .10 | 1,260 | 25,300 | |
| | .20 | 1,670 | | 52,500 |
| | .40 | 1,740 | | 56,900 |
| | 1.00 | 1,760 | | 57,350 |
| 1,800° F | .10 | 545 | 11,000 | |
| | .20 | 770 | 7,800 | |
| | .40 | 725 | 3,700 | |
| | .75 | 750 | | 24,500 |
| | 1.00 | 795 | | 26,000 |

For comparison purposes, similar tests were performed using other types of brazing alloys prepared in the same manner to form similar joints. The results are shown in Table 2:

Table 2

| Brazing Alloy | Test Temperature, °F. | Pounds to Fail At— | |
|---|---|---|---|
| | | .20" Overlap | .40" Overlap |
| Copper | Room | 3,250 | 4,050 |
| 85% Ag—15% Mn | Room | 3,100 | 3,400 |
| GE-81 | Room | 2,070 | 2,475 |
| My Alloy | Room | 1,950 | 2,550 |
| GE-81 | 1,500 | 1,755 | |
| My Alloy | 1,500 | 1,620 | 1,740 |
| Copper | 1,500 | 600 | 1,070 |
| 85% Ag—15% Mn | 1,500 | 524 | 720 |
| GE-81 | 1,800 | 785 | 775 |
| My Alloy | 1,800 | 770 | 725 |

EXAMPLE 2

Alloys of the following preferred range prepared and tested as in Example 1, were found to have essentially the same properties and usefulness as my specifically preferred alloy:

| | Percent by weight |
|---|---|
| Chromium | 18–22 |
| Silicon | 9–11 |
| Manganese | 7–10 |
| Nickel | [1] Balance |

[1] Including impurities.

EXAMPLE 3

Alloys of the following range, prepared and tested as in Example 1, were found to be useful as elevated temperature brazing alloys:

| | Percent by weight |
|---|---|
| Chromium | 10–30 |
| Silicon | 8–12 |
| Manganese | 7–15 |
| Nickel | [1] Balance |

[1] Including impurities.

I noted, however, that as the manganese content increased and the chromium content decreased, poorer oxidation resistance was imparted to the alloy. I found that a decrease in the manganese created an increase in melting point so that my useful range of manganese to reduce melting point was 7–15% by weight.

In the foregoing description I have disclosed an improved nickel-base, nickel-chromium-silicon-manganese type of brazing alloy for use up to about 1800° F. Although I have described my invention in connection with specific examples, these examples are to be construed as illustrative of rather than limitations on my alloy in the broad range I have described above. Those skilled in the art of brazing will readily understand the modifications and variations of which my invention is capable, for example, as to the varation and sizes of powder made from my alloy, the time and temperature cycles of brazing, the atmospheres involved, the types and thicknesses of metals being joined, and the methods of application of my brazing alloy to the joints to be brazed. I intend in the appended claims to cover modifications and variations that come within the true spirit and scope of my invention.

What I claim as new and desire to secure by Letters Patent of the United States is:

1. An improved nickel-base brazing alloy comprising in percent by weight: about 10-30 chromium; about 8-12 silicon; about 7-15 manganese; and the balance essentially nickel and impurities.

2. An improved nickel-base brazing alloy suitable for use up to about 1800° F. comprising in percent by weight: about 18-22 chromium; about 9-11 silicon; about 7-10 manganese; and the balance essentially nickel and impurities.

3. An improved nickel-base brazing alloy suitable for use up to about 1800° F. comprising in percent by weight: about 20 chromium; about 9.5 silicon; about 9 manganese; and the balance essentially nickel and impurities.

References Cited in the file of this patent

UNITED STATES PATENTS

| | | |
|---|---|---|
| 1,513,806 | Fink | Nov. 4, 1924 |
| 2,245,566 | Bolton | June 17, 1941 |
| 2,714,760 | Boam et al. | Aug. 9, 1955 |